Sept. 12, 1967  A. T. HOADLEY  3,340,595
METHOD OF, AND APPARATUS FOR, CONNECTING APERTURED
MEMBERS TO SPLIT RINGS
Filed Feb. 2, 1965

INVENTOR.
ARTHUR T. HOADLEY
BY
ATTORNEY.

3,340,595
METHOD OF, AND APPARATUS FOR, CONNECTING APERTURED MEMBERS TO SPLIT RINGS
Arthur T. Hoadley, 89 Regent Terrace, Devon, Conn. 06460
Filed Feb. 2, 1965, Ser. No. 429,760
16 Claims. (Cl. 29—433)

ABSTRACT OF THE DISCLOSURE

A method of rapidly assembling an apertured member with a very small split ring formed by closely lapping convolutions of spring wire, as for coupling together components of fishing tackle such as spinners, and apparatus operative to speed up the practice of such method.

Summary of the invention

This invention relates to a method of, and apparatus for, connecting apertured members together by split rings.

Split ring connectors usually comprise two convolutions of spring wire, with each convolution in contact with the other, and with the ends of the wire in separate convolutions at substantially the same angular location about the connector. Such connecators are used for a variey of purposes, e.g., when of a relatively large size, they are often used as simple key rings. The assembling of keys or other apertured elements onto relatively large split rings is not difficult due to the size of the split ring. However, many uses of such connectors require relatively small split rings, and the difficulty in assemblying apertured members on the small split rings increases very rapidly as the size of the split ring decreases. The connecting together of fish lures and hooks is only one example of the requirement of small split ring connectors.

The principal object of this invention is to provide a method of, and apparatus for, assembling apertured members onto split rings.

Another object of the invention is to provide such a method and apparatus in which one end of the split ring is separated from contacting the other convolution so that an apertured member can be hooked onto the separated end.

Still another object of the invention is to rotate the split ring by engaging its end opposite that onto which the apertured member is hooked while holding the apertured member.

In one aspect of the invention, a shaft may be mounted for rotation in a standard, and gearing may be provided for rotating the shaft through 360 degrees. The shaft may have removably attached to it a head which may include an annular recess concentric with the axis of rotation of the shaft. The annular recess may be of such dimension as to receive one convolution of a given size split ring, and there may be a stop within said recess against which one end of the wire forming the split ring contacts.

In another aspect of the invention, a blade or wedge may be attached to a pivotally mounted member and arranged, when said member is pivoted, to pass across the face of said head and become stationed in contact therewith.

In still another aspect of the invention, the blade is designed so that as it passes across the face of the head, with a split ring held thereagainst so that one of its convolutions rests within the recess and one of its ends against the abutment therein, the blade passes between the two convolutions of the split ring, maintaining one convolution within the annular recess while spreading the other convolution so that the end of the wire forming the split ring opposite that within the annular recess can pass through an aperture in a member to be connected onto the split ring. The construction is such that rotation of the shaft through 360 degrees will cause the apertured member to be connected to the split ring.

In a further aspect of the invention, means may be provided on the blade to ensure that the trailing end of the wire of the split ring will snap into position without interfering with the apertured end of the apertured member.

In a still further aspect of the invention, latching means may be provided for holding the pivoted member with the knife blade in contact with the face of the head until the shaft has been rotated through 360 degrees, after which the pivoted member is released and returned to a rest position.

The above, other objects and novel features of the improved apparatus for connecting apertured members to split rings will become apparent from the following specification and accompanying drawings which are merely exemplary.

Figure 1:
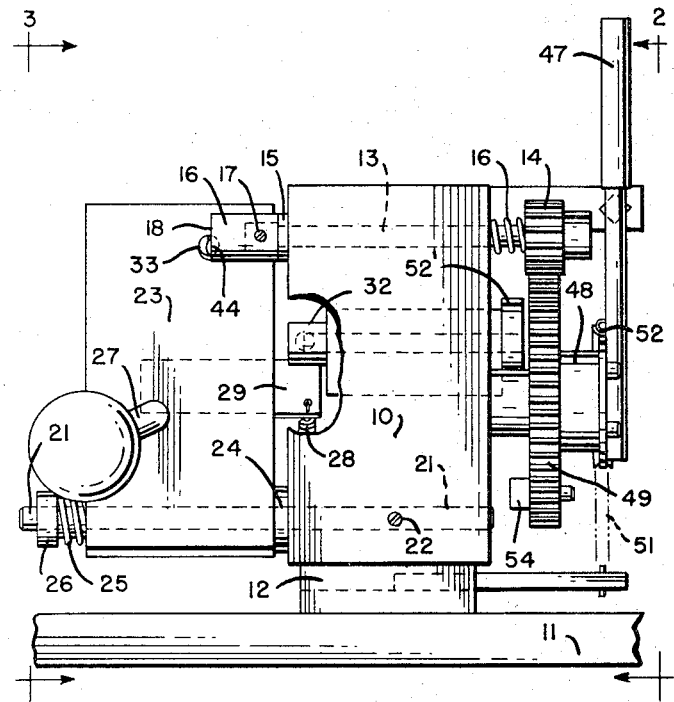
FIG. 1 is a front elevational view of apparatus to which the principles of the invention have been applied.

Referring to the drawings, the principles of the invention are shown as applied to apparatus including a standard 10 mounted on a base 11 by a bracket 12. A shaft 13 is journaled in a bearing in standard 10. A spur gear 14 is fixed to one end of shaft 13, and a collar 15 is fixed near the other end of shaft 13. A spring 16 on shaft 13 acts against the edge of standard 10 and gear 14 to maintain collar 15 in contact with the opposite edge of standard 10.

A head 16 is removably attached to the end of shaft 13 by a set screw 17. The face 18 of head 16 includes an annular groove 19 having an abutment 20 therein for a purpose to be described later.

A shaft 21 is fixed within a passage in the lower part of standard 10 by a set screw 22. A plate 23 includes a passage therethrough for receiving shaft 21 for pivotal movement thereon. A spacer 24 separates plate 23 from standard 10, and a spring 25 and collar 26 maintain plate 23 against spacer 24.

A handle 27 is fixed to plate 23 for pivoting it about shaft 21. Normally plate 23 is held in the position shown in FIG. 3 by a spring 28, one end of which is connected to bracket 12, and the other end of which is connected to an adjustable latch 29. When plate 23 is pivoted clockwise (FIG. 3), latch 29 is received by a notch 30 in a bar 31 fixed to a rod 32 journaled in bearings behind standard 10. A spring 32' has one of its ends connected to bracket 12 and its other end connected to bar 31 so that as latch 29 becomes aligned with notch 30, bar 31 moves counterclockwise to lock plate 23 in its forward position.

Figure 4:
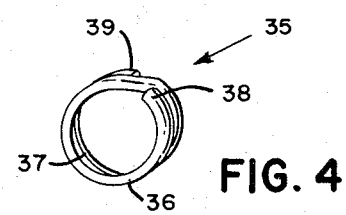
FIG. 4 is a perspective view of a split ring connector.

The plate 23 removably supports a wedge in the form of a knife blade element 33 by a set screw 34. Blade 33 has peculiarly formed edges for the purpose of separating the convolutions of a split ring 35 (FIG. 4). The split ring 35 is made from spring steel wire and includes two convolutions 36 and 37 helically arranged and in contact with each other. The leading end 38 of the wire ring is substantially in line with the trailing end 39 thereof.

Figure 3:
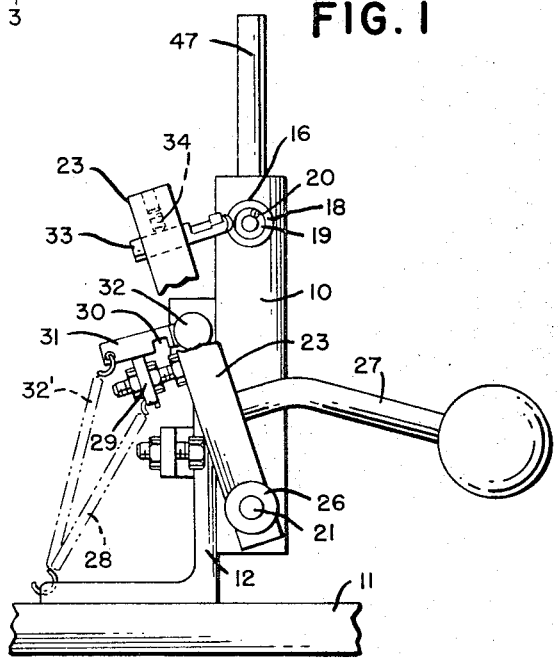
FIG. 3 is an elevational end view of the apparatus shown in FIG. 1 as viewed in looking in the direction of the arrows along line 3—3 of FIG. 1.

Blade 33 includes a rounded end edge 40 that increases in thickness back from the end of blade 33. Blade 33 also includes a top knife edge 41 that is relieved at 42, and a shoulder 43 is provided beneath edge 41, all for a purpose to be described later. The construction is such that one face 44 of the blade 33 is flat and is adapted to slide along the front face of the head 16 when plate 23 is pivoted in a clockwise direction (FIG. 3).

A split ring 35 is placed against face 18 so that its convolution 37 is received within annular groove 19 and such that the trailing end 39 contacts abutment 20 therein. The split ring is held in place by a finger of the operator, and the plate 23 is pivoted clockwise (FIG. 3). The forward, rounded-end knife edge 40 passes between convolutions 36, 37, separating them. As the plate reaches its forward-most position, shoulder 43 separates the leading end 38 a greater distance, and the relieved portion 42 prevents overstressing the convolutions which might otherwise produce a permanent set in the spring wire.

Figure 5:
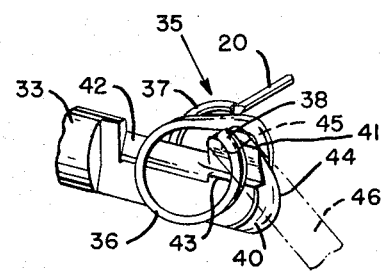
FIG. 5 is a perspective view showing how the connector is separated.

The degree of separation of the leading end 38 and the construction of shoulder 43 are such that an aperture 45 in an element 46 can be threaded thereover as shown in FIG. 5, and such that the end of element 46 lies below the top of portion 41. By rotating shaft 13 and head 16 in a counterclockwise direction (FIG. 3), the abutment 20 is caused to thrust circumferentially against the trailing end 39 of split ring 35, and since ring 35 is now held in place with its convolution 37 in groove 19, ring 35 turns counterclockwise also. By holding onto the aperture member 46, succeeding portions of the convolutions 36 and 37 pass through aperture 45.

It is necessary to ensure that the trailing end 39 is spread apart from convolution 36 when said end rises above the end of member 46 to permit said trailing end 39 to snap into contact with convolution 36 and not interfere with the end of member 46. Otherwise, the threading will be incomplete and unsatisfactory. The top of portion 41 on knife blade 33 lies slightly above the top of member 46 when the latter is in proper position on the leading end 38 and, therefore, as the trailing end 39 moves along face 44 of blade 33 as ring 35 rotates, end 39 will not pass above the top of portion 41 until after end 39 has passed above the top of portion 46, at which point the end 39 snaps into contact with convolution 36 and releases the split ring 35 with the member 46 connected thereto.

Figure 2:
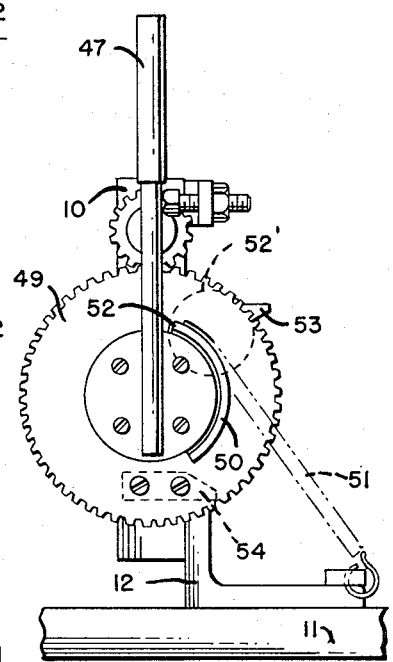
FIG. 2 is an elevational end view of the apparatus shown in FIG. 1, as viewed in looking in the direction of the arrows along line 2—2 of FIG. 1.

In order to rotate head 16 and shaft 13, a handle 47 (FIGS. 1 and 2) is connected to a hub 48 of a gear 49. Gear 49 meshes with gear 14 and is much larger than gear 14 so that a partial revolution of gear 49 rotates gear 14 sufficiently to complete a cycle of operation of head 16. Also connected to hub 48 is a trough-like arcuate member 50 adapted to receive a spring 51. One end of spring 51 is connected to bracket 12 while the other end is connected to the leading end 52 of member 50, thereby biasing the gear 49 in a clockwise direction (FIG. 2). With split ring 35 mounted on the face 18 of head 16, as previously explained, the aperture 45 of a member such as 46 is threaded over the leading end 38 of ring 35. The operator holds member 46 with his left hand and turns handle 47 counterclockwise (FIG. 2) with his right hand. This rotates head 16 and ring 35, effecting the connection of the ring to the apertured member 46.

Shaft 32 has a collar 52′ fixed thereto, and it includes a dog 53 in line with a dog 54 on gear 49. Consequently, when the operation has been completed and the split ring released from the face of head 16, dog 54 acts on dog 53, rotating shaft 32 clockwise (FIG. 3), thereby releasing notch 30 from latch 29, whereupon spring 28 returns plate 23 to its retracted position shown in FIG. 3.

Although the various features of the improved apparatus for connecting apertured members to split rings have been shown and described in detail to fully disclose one embodiment of the invention, it will be evident that changes may be made in such details, and certain features may be used without others without departing from the principles of the invention. The foregoing described operation of the apparatus will be recognized as merely illustrative of a combination of method steps that are utilized in assembling the ring and the apertured member, some of which steps must be performed by finger maneuvering of the parts to be assembled and all of which steps can be performed without aid of the particular apparatus herein disclosed and claimed.

What is claimed is:

1. The method of looping together a split ring formed by close wound helical convolutions of spring wire having a leading end and a trailing end and a member containing an anchorage aperture spaced from an edge of said member by a slim margin of the latter, which comprises the steps of, immobilizing substantially all of said ring except a first convolution thereof that terminates in a free leading end of said wire, stationing a wedge between said first convolution and an axially adjacent convolution at a point on said ring sufficiently near said free end of said wire to hold said leading end axially separated from said adjacent convolution by a space substantially as wide as said margin of said member, threading the aperture in said member over said leading end of said wire into occupancy of said space in the neighborhood of said wedge, arresting said member against departure from the neighborhood of said wedge, and rotating said ring circumferentially a sufficient angular extent to cause the trailing end of said wire to pass and clear both said wedge and said member, whereby to permit escape of said ring from said stationary wedge and imprison said member on said ring.

2. The method defined in claim 1, in which the said step of rotating the said ring is performed by thrusting against said trailing end of the said wire in circumferential direction.

3. Apparatus for connecting an apertured member onto a split ring made of spring wire having two convolutions in contact with each other, the leading and trailing ends of said wire being at substantially the same angular position about said ring, comprising in combination a head having a face including an annular groove, said head being mounted for rotation; an abutment in said groove against which the trailing end of a split ring is adapted to contact with the groove receiving one convolution of said ring; a knife blade mounted for movement across the face of said head and adapted to be passed between said convolutions, whereby the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

4. Apparatus for connecting an apertured member onto a split ring made of spring wire having a plurality of convolutions in contact with each other, the leading and trailing ends of said wire being at substantially the same angular position about said ring, comprising in combination a head having a face including an annular groove, said head being mounted for rotation; an abutment in said groove against which the trailing end of a split ring is adapted to contact with the groove receiving the convolution of said ring including said trailing end; a knife blade mounted for movement across the face of said head and adapted to be passed between certain convolutions, whereby the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

5. Apparatus for connecting an apertured member onto a split ring made of spring wire having two convolutions in contact with each other, the leading and trailing ends of said wire being at substantially the same angular position about said ring, comprising in combination a head mounted for rotation; means on said head for holding a split ring in position thereon for rotation with said head; means mounted for movement across the face of said head and adapted to be passed between said convolutions so that the leading end of said ring is separated from the convolution it normally contacts sufficiently to receive the apertured end of a member; and means for rotating said head until the traling end of said ring is above the apertured end of said member and snaps into contact with its adjacent convolution without interfering with said apertured end.

6. Apparatus for connecting an apertured member onto a split ring made of spring wire having a plurality of convolutions in contact with each other, the leading and trailing ends of said wire being at substantially the same angular position about said ring, comprising in combination a head mounted for rotation; means on said head for holding a split ring in position thereon for rotation with said head; means mounted for movement across the face of said head and adapted to be passed between certain convolutions so that the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

7. Apparatus for connecting an apertured member onto a split ring made of spring wire having two convolutions in contact with each other, the leading and trailing ends of said wire being at substantially the same angular position about said ring, comprising in combination a head having a face including an annular groove, said head being mounted for rotation; an abutment in said groove against which the trailing end of a split ring is adapted to contact with the groove receiving one convolution of said ring; a knife blade mounted for movement across the face of said head, said knife blade including a leading knife edge end, a shoulder portion extending backwardly therefrom forming a longitudinally extending knife edge that is recessed from a front end portion thereof backwardly, said knife blade being adapted to be passed between said convolutions, whereby the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

8. Apparatus for connecting an apertured member onto a split ring made of spring wire having a plurality of convolutions in contact with each other, the leading and trailing end of said wire being at substantially the same angular position about said ring, comprising in combination a head having a face including an annular groove, said head being mounted for rotation; an abutment in said groove against which the trailing end of a split ring is adapted to contact with the groove receiving the convolution of said ring including said trailing end; a knife blade mounted for movement across the face of said head, said knife blade including a leading knife edge end, a shoulder portion extending backwardly therefrom forming a longitudinally extending knife edge that is recessed from a front end portion thereof backwardly, said knife blade being adapted to be passed between certain convolutions, whereby the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

9. Apparatus for connecting an apertured member onto a split ring made of spring wire having two convolutions in contact with each other, the leading and trailing ends of said wire being at substantially the same angular position about said ring, comprising in combination a head mounted for rotation; means on said head for holding a split ring in position thereon for rotation with said head; means mounted for movement across the face of said head, said means including a leading knife edge end, a shoulder portion extending backwardly therefrom forming a longitudinally extending knife edge that is recessed from a front end portion thereof backwardly, said means being adapted to be passed between said convolutions so that the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

10. Apparatus for connecting an apertured member onto a split ring made of spring wire having a plurality of convolutions in contact with each other, the leading and trailing ends of said wire being at substantially the same angular position about said ring, comprising in combination a head mounted for rotation; means on said head for holding a split ring in position thereon for rotation with said head; means mounted for movement across the face of said head, said means including a leading knife edge end, a shoulder portion extending backwardly therefrom forming a longitudinally extending knife edge that is recessed from a front end portion thereof backwardly, said means being adapted to be passed between certain convolutions so that the leading end of said ring is separated from the convolution it normally contacts sufficiently to receive the apertured end of a member; and means for rotating said head until the trailing end of said ring is above the apertured end of said member and snaps into contact with its adjacent convolution without interfering with said apertured end.

11. Apparatus for connecting an apertured member onto a split ring made of spring wire having two convolutions in contact with each other, the leading and trailing ends of said wire being at substantially the same angular position about said ring, comprising in combination a head having a face including an annular groove, said head being mounted for rotation; an abutment in said groove against which the trailing end of a split ring is adapted to contact with the groove receiving one convolution of said ring; a knife blade mounted for movement across the face of said head and adapted to be passed between said convolutions, whereby the leading end of said ring is separated from the convolution it normally contacts sufficiently to receive the apertured end of a member; latch means for holding said blade in position against the face of said head; means for rotating said head until the trailing end of said ring is above the apertured end of said member and snaps into contact with its adjacent convolution without interfering with said apertured end; and means for releasing said latch means after said rotation of said head has been completed.

12. Apparatus for connecting an apertured member onto a split ring made of spring wire having a plurality of convolutions in contact with each other, the leading and trailing ends of said wire being at substantially the same angular position about said ring, comprising in combination a head having a face including an annular groove, said head being mounted for rotation; an abutment in said groove against which the trailing end of a split ring is adapted to contact with the groove receiving the convolution of said ring including said trailing end; a knife blade mounted for movement across the face of said head and adapted to be passed between certain convolutions, whereby the leading end of said ring is separated from the convolution it normally contacts sufficiently to receive the apertured end of a member; latch means for holding said blade in position against the face of said head; means for rotating said head until the trailing end of said ring is above the apertured end of said member and snaps into contact with its adjacent convolution without interfering with said apertured end; and means for releasing said latch means after said rotation of said head has been completed.

13. Apparatus for connecting an apertured member onto a split ring made of spring wire having two convolutions in contact with each other, the leading and trailing ends of said wire being at substantially the same angular position about said ring, comprising in combination a head mounted for rotation; means on said head for holding a split ring in position thereon for rotation with said head; other means mounted for movement across the face of said head and adapted to be passed between said convolutions so that the leading end of said ring is separated from the convolution it normally contacts sufficiently to receive the apertured end of a member; latch means for holding said other means in position against the face of said head; means for rotating said head until the trailing end of said ring is above the apertured end of said member and snaps into contact with its adjacent convolution without interfering with said apertured end; and means for releasing said latch means after said rotation of said head has been completed.

14. Apparatus for connecting an apertured member onto a split ring made of spring wire having a plurality of convolutions in contact with each other, the leading and trailing ends of said wire being at substantially the same angular position about said ring, comprising in combination a head mounted for rotation; means on said head for holding a split ring in position thereon for rotation with said head; other means mounted for movement across the face of said head and adapted to be passed between certain convolutions so that the leading end of said ring is separated from the convolution it normally contacts sufficiently to receive the apertured end of a member; latch means for holding said other means in position against the face of said head; means for rotating said head until the trailing end of said ring is above the apertured end of said member and snaps into contact with its adjacent convolution without interfering with said apertured end; and means for releasing said latch means after said rotation of said head has been completed.

15. Appaartus for connecting an apertured member onto a split ring made of spring wire having two convolutions in contact with each other, the leading and trailing ends of said wire being at substantially the same angular position about said ring, comprising in combination a head having a face including an annular groove against which the trailing end of a split ring is adapted to contact with the groove receiving one convolution of said ring; a knife blade mounted for movement across the face of said head, said knife blade including a leading knife edge end, a shoulder portion extending backwardly therefrom forming a longitudinally extending knife edge that is recessed from a front end portion thereof backwardly, said knife blade being adapted to be passed between said convolutions, whereby the leading end of said ring is separated from the convolution it normally contacts sufficiently to receive the apertured end of a member; latch means for holding said blade in position against the face of said head; means for rotating said head until the trailing end of said ring is above the apertured end of said member and snaps into contact with its adjacent convolution without interfering with said apertured end; and means for releasing said latch means after said rotation of said head has been completed.

16. Apparatus for connecting an apertured member onto a split ring made of spring wire having a plurality of convolutions in contact with each other, the leading and trailing ends of said wire being at substantially the same angular position about said ring, comprising in combination a head having a face including an annular groove against which the trailing end of a split ring is adapted to contact with the groove receiving the convolution of said ring including said trailing end; a knife blade mounted for movement across the face of said head, said knife blade including a leading knife edge end, a shoulder portion extending backwardly therefrom forming a longitudinally extending knife edge that is recessed from a front end portion thereof backwardly, said knife blade being adapted to be passed between certain convolutions, whereby the leading end of said ring is separated from the convolution it normally contacts sufficiently to receive the apertured end of a member; latch means for holding said blade in position against the face of said head; means for rotating said head until the trailing end of said ring is above the apertured end of said member and snaps into contact with its adjacent convolution without interfering with said apertured end; and means for releasing said latch means after said rotation of said head has been completed.

References Cited

UNITED STATES PATENTS 2,210,061   8/1940   Caminez _____ 29—227 X
3,134,406   5/1964   Freundlich et al. ___ 29—240.5 X JOHN F. CAMPBELL, *Primary Examiner.*

THOMAS H. EAGER, *Examiner.*